United States Patent
Hiraishi

(10) Patent No.: US 10,967,680 B2
(45) Date of Patent: Apr. 6, 2021

(54) TIRE

(71) Applicant: BRIDGESTONE CORPORATION, Tokyo (JP)

(72) Inventor: Tomohiro Hiraishi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 328 days.

(21) Appl. No.: 16/303,801

(22) PCT Filed: Jun. 13, 2017

(86) PCT No.: PCT/JP2017/021862
§ 371 (c)(1),
(2) Date: Nov. 21, 2018

(87) PCT Pub. No.: WO2017/217426
PCT Pub. Date: Dec. 21, 2017

(65) Prior Publication Data
US 2019/0329596 A1 Oct. 31, 2019

(30) Foreign Application Priority Data
Jun. 14, 2016 (JP) .............................. JP2016-118135

(51) Int. Cl.
*B60C 11/00* (2006.01)

(52) U.S. Cl.
CPC ................................ *B60C 11/0083* (2013.01)

(58) Field of Classification Search
CPC .................... B60C 11/0083; B60C 11/0304
USPC ............................................. 152/209.8–209.9
See application file for complete search history.

(56) References Cited

U.S. PATENT DOCUMENTS

| | | | |
|---|---|---|---|
| 4,763,708 A * | 8/1988 | Takahashi | B60C 3/06 152/209.14 |
| 5,299,612 A | 4/1994 | Saito et al. | |
| 5,735,979 A * | 4/1998 | Secondari | B60C 3/06 152/209.5 |

(Continued)

FOREIGN PATENT DOCUMENTS

| | | |
|---|---|---|
| CN | 1572545 A | 2/2005 |
| CN | 104114380 A | 10/2014 |

(Continued)

OTHER PUBLICATIONS

Machine Translation: JP-2000062415-A, Seta, Eisuke, (Year: 2020).*

(Continued)

*Primary Examiner* — Kendra Ly
(74) *Attorney, Agent, or Firm* — Kenja IP Law PC

(57) ABSTRACT

Provided is a tire, comprising a tread surface divided into a plurality of land portions by at least one circumferential groove extending along a tire equator and tread edges, wherein at least an outline on one side of the tire equator of the tread surface comprises a plurality of arcs each having a different radius of curvature in a width direction cross-sectional view of the tire; an arc having a minimum radius of curvature among the plurality of arcs lies in a land portion having a maximum tread width direction length among the plurality of land portions; and an arc having a larger radius of curvature is disposed on a tread edge side of the arc having the minimum radius of curvature.

14 Claims, 3 Drawing Sheets

(56) References Cited

U.S. PATENT DOCUMENTS

| | | |
|---|---|---|
| 2004/0244895 A1 | 12/2004 | Nguyen et al. |
| 2005/0241738 A1 | 11/2005 | Shida |
| 2014/0352861 A1 | 12/2014 | Sabetti |
| 2016/0236519 A1* | 8/2016 | Wakiyama .......... B60C 11/1376 |

FOREIGN PATENT DOCUMENTS

| | | | | |
|---|---|---|---|---|
| CN | 105059058 A | | 11/2015 | |
| CN | 105059058 A | * | 11/2015 | ......... B60C 11/0083 |
| EP | 1541382 A1 | | 6/2005 | |
| EP | 2889159 A2 | | 7/2015 | |
| JP | S58112804 A | | 7/1983 | |
| JP | H0195909 A | | 4/1989 | |
| JP | H03204305 A | | 9/1991 | |
| JP | H04185505 A | | 7/1992 | |
| JP | H0999714 A | | 4/1997 | |
| JP | H10100618 A | | 4/1998 | |
| JP | H1159128 A | | 3/1999 | |
| JP | 11165504 A | * | 6/1999 | ......... B60C 11/0083 |
| JP | H11165504 A | | 6/1999 | |
| JP | 2000062415 A | * | 2/2000 | |
| JP | 2002029216 A | | 1/2002 | |
| JP | 2006213205 A | | 8/2006 | |
| JP | 2010042711 A | * | 2/2010 | ......... B60C 11/0083 |
| JP | 2015024797 A | * | 2/2015 | ......... B60C 11/1263 |
| JP | 2015074335 A | | 4/2015 | |
| KR | 20040005444 A | * | 1/2004 | |
| WO | 2004024473 A1 | | 3/2004 | |

OTHER PUBLICATIONS

Machine Translation: JP-2015024797-A, Inoue Seiji, (Year: 2020).*
Machine Translation: JP-2010042711-A, Sekoguchi, Masaharu, (Year: 2020).*
Machine Translation: KR-20040005444-A, Lee Dong Hui, (Year: 2020).*
Machine Translation: JP-11165504-A; Kaneko, Kenji; (Year: 2021).*
Machine Translation: CN-105059058-A; Ma Dajing; (Year: 2021).*
Sep. 12, 2017, International Search Report issued in the International Patent Application No. PCT/JP2017/021862.
Jun. 9, 2020, search result of the Extended European Search Report issued by the European Patent Office in the corresponding European Patent Application No. 20152323.0.
Feb. 21, 2020, search result of Office Action issued by the China National Intellectual Property Administration in the corresponding Chinese Patent Application No. 201780036502.1.
May 24, 2019, search result of the Extended European Search Report issued by the European Patent Office in the corresponding European Patent Application No. 17813322.9.

* cited by examiner

TIRE

TECHNICAL FIELD

The present disclosure relates to tires, particularly to high performance tires having high movement performance and uneven wear resistance performance.

BACKGROUND

For so-called high performance tires to be used for high speed running, in addition to performance for straight running at high speed, excellent turning performance in a high speed region is also strongly demanded. In anticipation of improving, particularly the turning performance of such high performance tires, PTL 1 proposes to make the curvature of the outline shape of the tread surface different on both sides of the maximum diameter point so as to be asymmetric, and form the tread surface outline shape on one side of the maximum diameter point by arcs having three or more radii of curvature that decrease from the maximum diameter point toward a shoulder edge, thereby improving the lateral grip performance and handling performance particularly during turning of the vehicle.

CITATION LIST

Patent Literature

PTL 1: JPH 09-99714 A

SUMMARY

Technical Problem

However, among high performance tires, especially tires to be used for running in a high speed region typified by circuit running, there is a case that the desired effect cannot be sufficiently obtained when applying the technology of the tread outline shape described in the above PTL 1, and improvement in this point has been desired.
Therefore, it is an object of the present disclosure to provide a tire having a tread outline shape suitable for a tire to be used for running in a high speed region.

Solution to Problem

The inventor conducted various studies on the tread outline shape of a tire to be used for running in a high speed region. Then, the inventor got new insight that in such a tire, there is a tendency to expand the land portion width of the tread surface in order to secure the rigidity of the tread, such that it is necessary to define the tread outline shape in consideration of such a tread configuration. That is, the inventor discovered that, since the ground contact pressure distribution in the land portion having the largest tread width direction length (also referred to as "the maximum width land portion") among the land portions formed in the tread surface is most likely to be deteriorated, it is effective for equalizing the ground contact pressure distribution of the tread by giving priority to the improvement in grounding property of the maximum width land portion and specifying the radii of curvature of the arcs included in the outline of the width direction cross section of the tread surface, and thereby completed the present disclosure.

The subject of this disclosure is as follows.
(1) A tire according to the present disclosure comprises a tread surface divided into a plurality of land portions by at least one circumferential groove extending along a tire equator and tread edges, wherein at least an outline on one side of the tire equator of the tread surface comprises a plurality of arcs each having a different radius of curvature in a width direction cross-sectional view of the tire; an arc having a minimum radius of curvature among the plurality of arcs lies in a land portion having a maximum tread width direction length among the plurality of land portions; and an arc having a larger radius of curvature is disposed on a tread edge side of the arc having the minimum radius of curvature.

Here, in the present disclosure, a "tread edge" refers to a ground end when a tire is mounted on an applicable rim, filled with a prescribed internal pressure and applied with a prescribed load; and an "applicable rim" refers to a rim prescribed by an industrial standard which is valid in an area where the tire is manufactured and used, and examples of the industrial standard include: "JATMA (The Japan Automobile Tyre Manufacturers Association, Inc.) YEAR BOOK" of Japan; "STANDARDS MANUAL" of ETRTO (The European Tyre and Rim Technical Organisation) of Europe; and "TRA (THE TIRE AND RIM ASSOCIATION INC.) Year Book" of the United States. In addition, a "prescribed internal pressure" refers to an air pressure corresponding to the maximum load of a single wheel in the applicable sizes described in the aforementioned predetermined industrial standard (maximum load capability); and a "prescribed load" refers to the maximum load of a single wheel in the applicable sizes described in the aforementioned predetermined industrial standard (maximum load capability).

Advantageous Effect

According to the present disclosure, by improving the grounding property of at least the maximum width land portion, the grounding property of the tread surface is also improved, and as a result, a tire with high movement performance and uneven wear resistance performance can be provided.

BRIEF DESCRIPTION OF THE DRAWINGS

In the accompanying drawings.

DETAILED DESCRIPTION

First Embodiment

Figure 1:
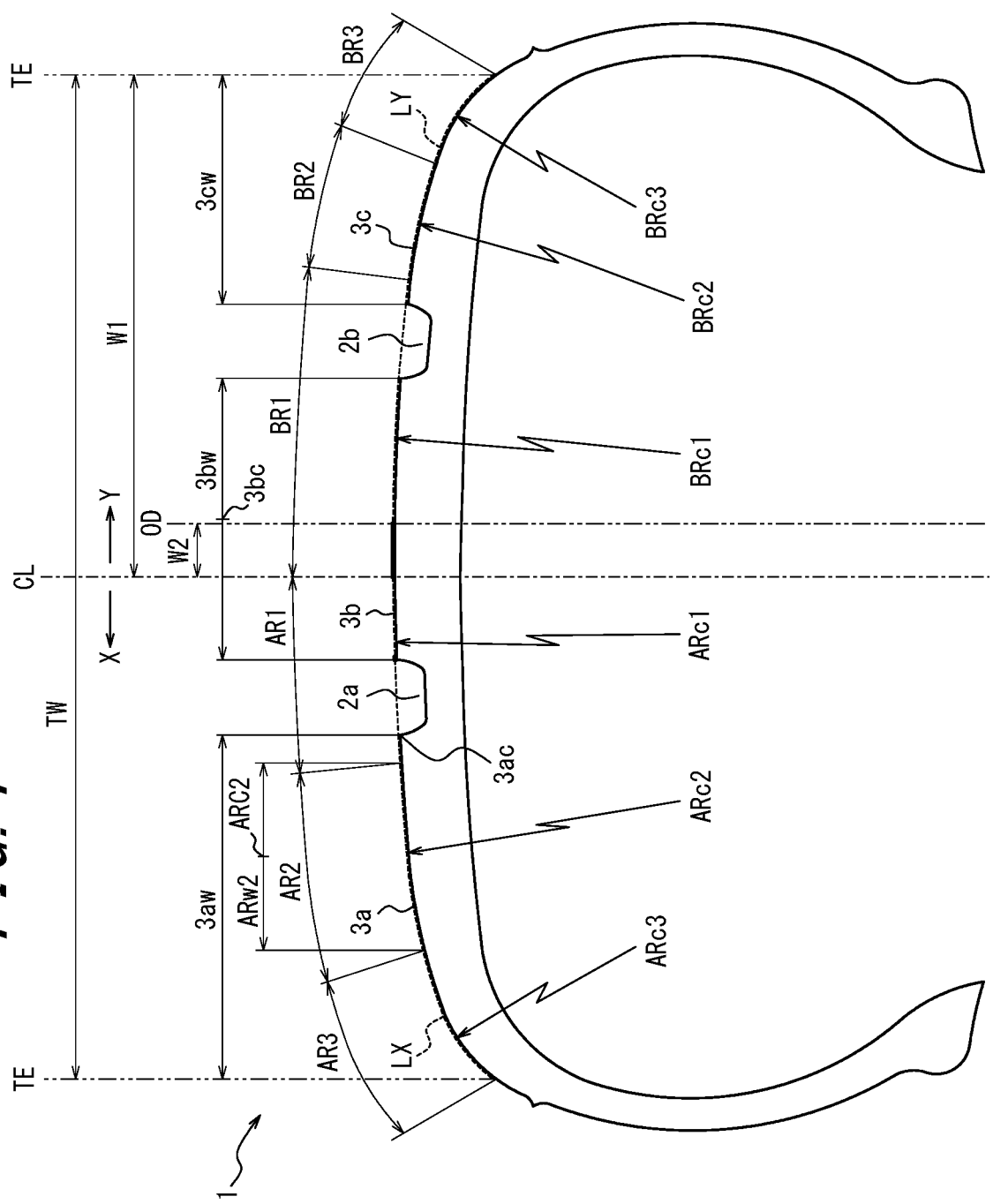
FIG. 1 is a width direction cross-sectional view of a tire according to a first embodiment of the present disclosure.

Hereinafter, a pneumatic tire according to the present disclosure (hereinafter, also referred to as "the tire") is described in details with reference to the accompanying drawings by exemplifying embodiments thereof. FIG. 1 is a width direction cross-sectional view of the tire according to the first embodiment of the present disclosure. The internal reinforcing structure and the like of the presently disclosed tire are similar to those of a general tire, and for example, a carcass extending in a toroidal form across a pair of bead cores is provided as a skeleton, two layers of belts are provided on the outer side of the carcass in the tire radial direction, and a tread is provided on the outer side of the belts in the tire radial direction. In this tread, a space between the tread edges TE illustrated in the drawings is a tread surface 1 of the tread (hereinafter, referred to as "the tread surface").

In the presently disclosed tire, the tread surface is divided into a plurality of land portions by at least one circumferential groove extending along a tire equator and tread edges. Specifically, in the illustrated tire, the tread surface 1 is divided into three land portions 3a, 3b and 3c by two circumferential grooves 2a and 2b extending along the tire equator CL and the tread edges TE. It is certain that the land portions 3a, 3b and 3c are land portions continuous in the tread circumferential direction between the circumferential grooves or between a circumferential groove and a tread edge TE, and a case in which each land portion is divided into a block row by lateral grooves extending between the circumferential grooves or between a circumferential groove and a tread edge is also included. Further, a sipe may be provided in a land portion or a block.

The illustrated land portions 3a, 3b and 3c each has a different tread width direction length (hereinafter, referred to as "the land portion width"); however, the land portion widths can be changed by the arrangement of the circumferential grooves 2a and 2b, and may be set according to the desired tire performance. For example, in a high performance tire, particularly during high speed turning of a vehicle, the tire mounting outer side is easily subjected to lateral forces. Therefore, by increasing the width of the land portion located on the tire mounting outer side, the rigidity can be advantageously increased.

Further, the illustrated circumferential grooves 2a and 2b are formed with the same width; however, different widths may be adopted.

In the above tire, the outline on one side of the tire equator of the tread surface 1 comprises at least three arcs each having a different radius of curvature. Among these arcs, the arc having the minimum radius of curvature included in the outline lies in the land portion having the maximum land portion width. Further, it is essential that an arc having a larger radius of curvature be disposed on the tread edge side of the arc having the minimum radius of curvature. Here, an "outline" refers to the outline of a tread surface in a tire width direction cross section in a state in which the tire is mounted on an applicable rim, filled with a prescribed internal pressure, and applied with a prescribed load.

The outlines LX and LY illustrated in FIG. 1 are respectively an outline LX on one side and an outline LY on the other side of the equator CL, connecting the outlines of the three land portions 3a, 3b and 3c by following the outlines of the land portions on both sides of the circumferential grooves 2a and 2b. The outlines LX and LY are a composite of a plurality of arcs having different radii of curvature. The illustrated example has the outline LX and the outline LY including six arcs AR1, AR2, AR3, BR1, BR2 and BR3. In addition, it is essential that of the land portions of the tread described above, the maximum width land portion 3a be composed of an outline including the arc AR2 having the minimum radius of curvature ARc2 among the outline LX. Here, "the maximum width land portion 3a be composed of an outline including the arc AR2" means that the center of the maximum width land portion 3a is located within the outline according to the arc AR2. Moreover, it is essential that the arc AR3 having a radius of curvature ARc3 larger than that of the arc AR2 be disposed on the tread edge side of the arc AR2 having the minimum radius of curvature ARc2.

That is, by composing the maximum width land portion 3a by the outline of the arc having the minimum radius of curvature ARc2, deterioration in grounding property of the tread surface when the maximum width land portion is provided can be suppressed. That is, in a land portion having a large width, when a load is applied to the tread surface during load rolling of the tire, forces concentrate at the boundary between the grooves defining the land portion and the side walls of the land portion, a stress is generated from the side walls of the land portion toward the inside of the land portion, deformation that pushes up the end portions in the width direction of the land portion is strengthened, such that the ground contact pressure of the land portion is high at the width direction end portions and low at the central portion. As a result, the ground contact pressure distribution within the land portion tends to be unbalanced. Therefore, by disposing the arc AR2 having the minimum radius of curvature ARc2 in the maximum width land portion 3a, the ground contact pressure at the central portion of the land portion is increased, and at least the ground contact pressure distribution of the maximum width land portion is equalized, such that the grounding property of the entire tread surface can be improved. Here, when disposing the arc AR2 as described above, it is essential that the arc AR3 having a radius of curvature ARc3 larger than ARc2 be disposed on the tread edge side of the arc AR2. This is because, during high speed turning of the vehicle, the ground contact pressure at the land portion close to the tread edge increases, and when an arc having a small radius of curvature is disposed, the ground contact pressure further increases, such that the imbalance of the ground contact pressure distribution, which should be prevented, is promoted. Further, since the effect of equalizing the ground contact pressure distribution by disposing the arc AR2 having the minimum radius of curvature ARc2 is based on that the maximum width land portion is composed by the outline including the arc having the minimum radius of curvature, it is an essential condition that an arc having a larger radius of curvature is disposed on the tread edge side or both sides of the arc AR2 having the minimum radius of curvature.

That is, irrespective of the layout of the land portions in FIG. 1, it is important that the maximum width land portion has an outline including an arc having the minimum radius of curvature on one side with the equator as the boundary. Accordingly, when there is a maximum width land portion on both sides of the equator, each maximum width land portion has an outline including an arc having the minimum radius of curvature on its side.

In the present disclosure, with the tire equator as the boundary, when the side where the maximum land portion 3a is located is defined as the X side, and the other side is defined as the Y side, it is preferable to mount the tire with the X side as the outer side of the vehicle. This is because, particularly during high speed turning of the vehicle, due to rolling of the vehicle and deformation of the tire, the footprint area of the tire on the outer side in the vehicle mounting direction tends to be larger than that on the inner side, and as a result, the land portion disposed on the outer side in the vehicle mounting direction is easily subjected to large lateral forces. Therefore, by increasing the width of the land portion on the outer side in the vehicle mounting direction of the tire, the rigidity of the land portion can be increased, the ground contact pressure distribution can be equalized, and the steering stability can be improved.

In the example illustrated in FIG. 1, the tread surface on the maximum width land portion 3a side of the equator CL (tread half portion on the X side) is such that, the main portion of the maximum width land portion 3a is composed of an outline according to the arc AR2 having the minimum radius of curvature, and connected with the arc AR1 on the equator side and the arc AR3 on the shoulder side, to form the outline LX of the tread half portion. In the illustrated example, it is preferable that the radii of curvature ARc1, ARc2 and ARc3 of the three arcs AR1, AR2 and AR3 that constitute the tread surface on the X side, which is the maximum land portion 3a side of the equator CL, satisfy the relationship of ARc1>ARc3>ARc2.

When the radii of curvature of the three arcs satisfy the above relationship, the ground contact pressure distribution of the tread surface can be equalized more effectively. That is, during high speed turning of the vehicle, the ground contact pressure at the land portion close to the tread edge increases, and when an arc having a small radius of curvature is disposed, the ground contact pressure further increases, such that the imbalance of the ground contact pressure distribution, which should be prevented, is promoted. Further, since the effect of equalizing the ground contact pressure distribution by disposing the arc AR2 having the minimum radius of curvature ARc2 is based on that the maximum width land portion is composed of the outline including the arc having the minimum radius of curvature, it is essential that an arc having a larger radius of curvature be disposed on both sides of the arc AR2 having the minimum radius of curvature. Furthermore, at the time of roaring start and sudden stop during straight running of the vehicle, since the ground contact pressure tends to concentrate near the equator CL, by setting the arc AR1 closest to the equator CL to have the maximum radius of curvature, the ground contact pressure can also be distributed to the outline according to the arc having the minimum radius of curvature. In this way, both the grounding property at the land portion close to the equator CL and the grounding property at the land portion close to the tread edge TE can be achieved.

In addition to satisfying the above relationship, it is preferable that the radius of curvature ARc2 and the other radii of curvature ARc1 and ARc3 satisfy the following ratio:

ARc2:(ARc1+ARc3)/2=(4 to 6):10.

By satisfying the above ratio, equalization of the ground contact pressure distribution between the arc AR3 when a lateral force is applied and the arc AR1 at the time of acceleration and deceleration during straight running of the vehicle, and the arc AR2 having the minimum radius of curvature can be realized at a higher dimension.

In the present disclosure, the Y side, which is the other side opposite to the side where the maximum width land portion 3a is located with respect to the equator CL, is such that, the arc formed by the outline LY is not particularly limited and may be formed according to a conventional outline; however, it is preferable that it is a series of arcs similarly to the outline LX. Specifically, the outline LY on the Y side in the illustrated example includes arcs BR1, BR2 and BR3 having different radii of curvature.

Here, it is preferable that the radii of curvature BRc1, BRc2 and BRc3 of the three arcs BR1, BR2 and BR3 constituting the tread surface on the Y side, which is the other side opposite to the maximum width land portion 3a side with respect to the equator CL, satisfy the relationship of BRc1>BRc3>BRc2. Further, it is preferable that the aforementioned radii of curvature and the radii of curvature ARc1, ARc2 and ARc3 of the arcs included in the outline LX on the X side, that is, the opposite side with respect to the equator CL, satisfy the following relationships (1) to (3):

$$ARc1 > BRc1; \quad (1)$$

$$ARc2 > BRc2; \text{ and} \quad (2)$$

$$ARc3 > BRc3. \quad (3)$$

As described above, in the present disclosure, it is preferable to set the X side to be the outer side in the vehicle mounting direction; however, during high speed turning of the vehicle, the footprint area on the outer side in the tire mounting direction is larger than that on the inner side, and thus, the land portion disposed on the outer side in the mounting direction is easily subjected to large lateral forces. However, by having the above configuration, it is possible to equalize the ground contact pressure distribution of the tread surface, counter the lateral forces, and improve the steering stability during turning.

In the present disclosure, it is preferable that the tire width direction center ARC2 of the arc AR2 having the minimum radius of curvature is located at 35% to 70% of the land portion width 3aw of the maximum width land portion 3a from the tire equator CL side end portion 3ac of the maximum width land portion 3a toward the tread edge TE side. In the maximum width land portion 3a, by disposing the center of the arc AR2 within the range in which the ground contact pressure tends to deteriorate, improvement in grounding property can be realized more effectively. More preferably, the aforementioned center ARC2 is located at 50% to 60% from the tire equator CL side end portion 3ac. During straight running of the vehicle, it is essential to improve the grounding property at the central portion of the maximum width land portion 3a; however, during turning of the vehicle, it is important to improve the grounding property within a wider range near the central portion.

In the present disclosure, it is preferable that the tread width direction length ARw2 of the arc AR2 having the minimum radius of curvature is 15% to 30% of the land portion width 3aw of the maximum width land portion 3a. When less than 15%, the grounding property cannot be sufficiently improved, and when exceeding 30%, the grounding property at the end portions of the maximum width land portion 3a is impaired. It is more preferably 22% to 28%. Thereby, the grounding property at the central portion and the end portions of the maximum width land portion 3a is optimized.

In the first embodiment of the present disclosure, as illustrated in FIG. 1, when the tread surface 1 is divided into three land portions 3a, 3b and 3c, it is preferable that the land portion width 3bw of the central land portion 3b located at the tread width direction center among the three land portions is 95% to 105% of the land portion width 3aw of the maximum width land portion 3a. Further, it is preferable that the tire width direction center 3bc of the central land portion 3b is located within the range of 10% or less of the tire land portion width 3bw of the central land portion 3b from the tire maximum outer diameter position OD of the tread surface 1. That is, during straight running of the tire, it is usual that the ground contact length of the tread surface in the circumferential direction is the longest at the maximum outer diameter portion of the tire, and gradually becomes shorter toward the tread edges of the tire. At this time, when the ground contact lengths at the end portions in the width direction of the central land portion extending over the maximum outer diameter portion differ greatly, a difference occurs in the wear amount between both end portions of the land portion, which leads to uneven wear of the tread. Therefore, by shifting the maximum diameter portion from the position of the land portion center such that the deviation falls within the aforementioned numerical value range, the difference in ground contact length therebetween is reduced and uneven wear is prevented.

In an ordinary tire, the equator and the maximum outer diameter position coincide; however, in the present disclosure, it is preferable that the maximum outer diameter position OD of the tire is closer to a tread edge TE side than the tire equator CL. In the illustrated example, it is disposed closer to the tread edge TE on the Y side with respect to the equator CL.

At this time, it is preferable to mount the tire with the Y side as the mounting direction inner side. That is, during high speed turning of the vehicle, the footprint area on the outer side tends to be larger than the inner side in the tire mounting direction. Therefore, as described above, since the ground contact length of the tire is usually the largest at the maximum diameter position, it is preferable that the maximum diameter position OD is located closer to the tread end TE side than the equator CL such that the footprint area on the inner side than the equator CL in the tire mounting direction can also be secured.

In the present disclosure, it is preferable that the tire width direction distance W2 from the position of the equator CL on the tread surface 1 to the maximum outside diameter position OD of the tire is 5% or more and 15% or less of the tread width TW of the tire. This is because, when less than 5%, the footprint area on the inner side in the tire mounting direction cannot be sufficiently secured, and when exceeding 15%, the grounding property on the inner side in the tire mounting direction is impaired.

Second Embodiment

Figure 2:
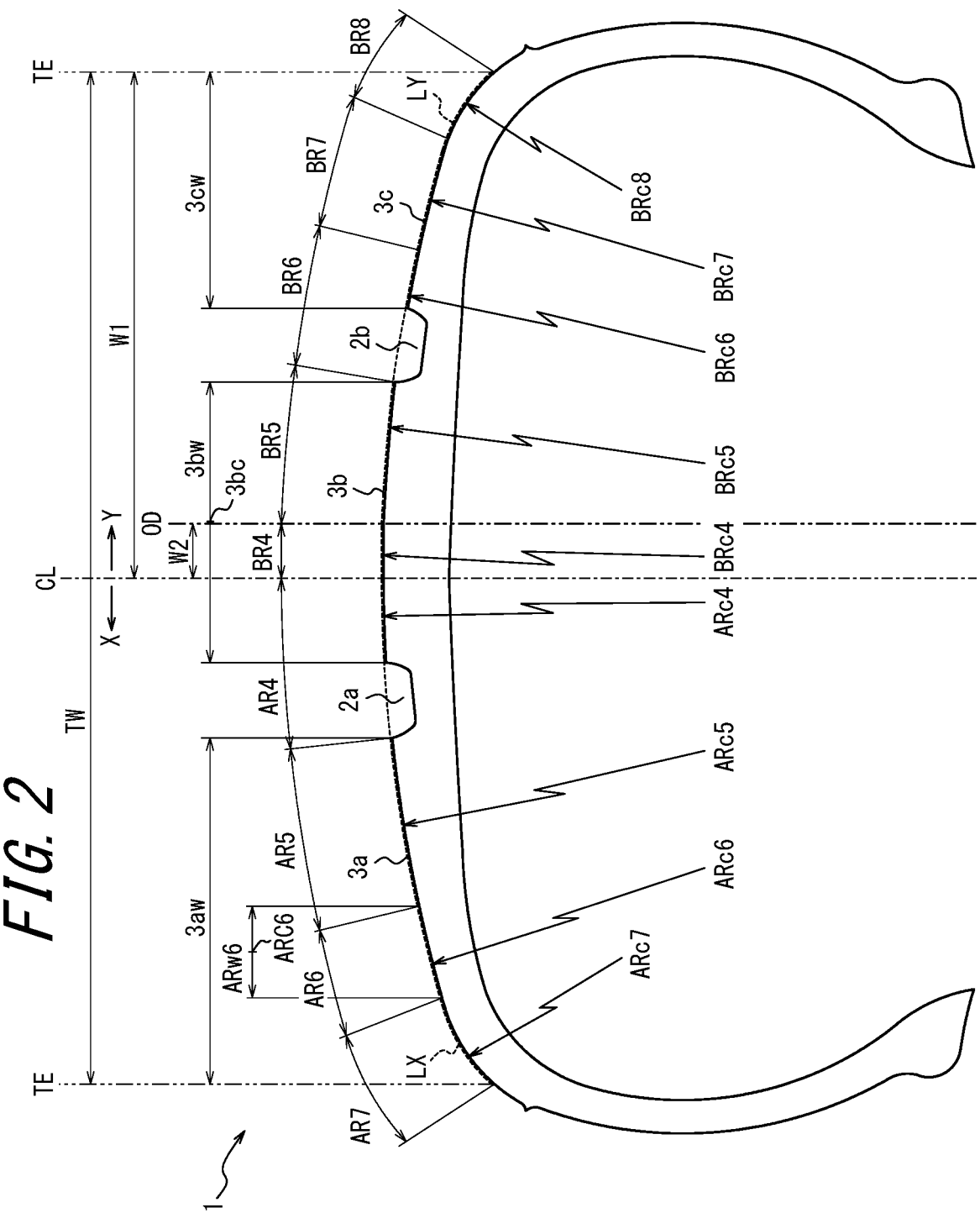
FIG. 2 is a width direction cross-sectional view of a tire according to a second embodiment of the present disclosure.

Next, an example in which the outline forming the tread surface includes four arcs on one side of the equator is described with reference to the tire width direction cross-sectional view of FIG. 2. In FIG. 2, components similar to those in FIG. 1 are given the same reference signs as in FIG. 1 and the description thereof is omitted. As illustrated in FIG. 2, three land portions 3a, 3b and 3c are defined by the two circumferential grooves 2a and 2b and the tread edges TE in the same manner as in FIG. 1.

In the present embodiment, the outline on one side of the tire equator CL is a composite of four arcs having different radii of curvature. In the illustrated example, on the X side of the tire equator CL, where the maximum width land portion 3a is located, a part of the maximum width land portion 3a is composed by an outline according to the arc AR6 having the minimum radius of curvature, and on both sides thereof, the arcs AR4 and AR5 on the equator side and the arc AR7 on the shoulder side are respectively connected to form the outline LX of the tread half portion. In this way, as compared with the example in FIG. 1, by increasing the type of arc to four, the difference in radius of curvature between the adjacent arcs can be reduced, and thus the grounding property of the tread can be achieved more effectively.

It is preferable that the radii of curvature ARc4, ARc5, ARc6 and ARc7 of the four arcs AR4, AR5, AR6 and AR7 having different radii of curvature included in the outline LX on one side of the equator CL satisfy the relationship of ARc4>ARc5>ARc7>ARc6. Further, the radius of curvature ARc6 and the other radii of curvature ARc4, ARc5 and ARc7 may satisfy the following ratio:

ARc6:(ARc4+ARc5+ARc7)/3=(10 to 15):100.

In the present disclosure, as illustrated, the tread surface 1 has the outlines LX and LY that include nine arcs AR4, AR5, AR6, AR7, BR4, BR5, BR6, BR7 and BR8 having different radii of curvature. That is, similarly to the X side, it is preferable that the other side with the equator as the boundary, namely the Y side, is also a series of arcs, and in the illustrated example, the outline LY on the Y side includes arcs BR4, BR5, BR6, BR7 and BR8 having different radii of curvature.

Except for the above, it is preferable that the present embodiment has the same configuration as that of the embodiment illustrated in FIG. 1.

Third Embodiment

Figure 3:
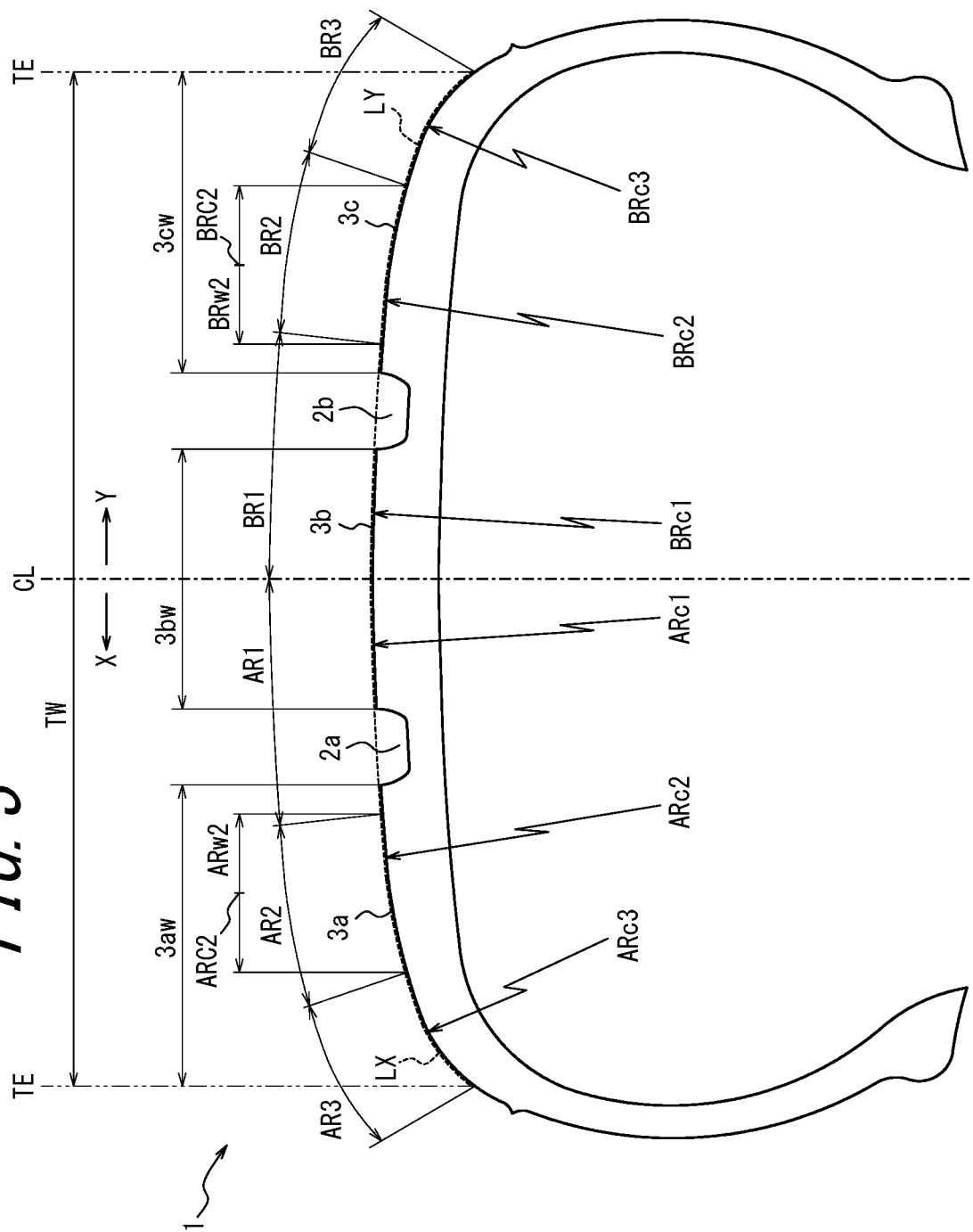
FIG. 3 is a width direction cross-sectional view of a tire according to a third embodiment of the present disclosure.

FIG. 3 illustrates an example in which both sides with the equator as the boundary have a maximum width land portion with the same width. The internal reinforcement structure and the like of the presently disclosed tire are the same as those of a general tire as in FIG. 1, and thus components similar to those in FIG. 1 are given the same reference signs as in FIG. 1 and the description thereof is omitted. As illustrated, in the tire of the present embodiment, three land positions 3a, 3b and 3c are also defined by the two circumferential grooves 2a and 2b and the tread edges TE.

In the present embodiment, the land portions 3a, 3b and 3c are such that, the land portions 3a and 3c have the same land portion width, and as illustrated, the land portions 3a and 3c are both maximum land portions having a larger land portion width than the land portion 3b. Further, in the present embodiment, the tread surface 1 is line-symmetrical on the X side and the Y side with the equator CL as the boundary in the illustrated example. In this way, by disposing a maximum width land portion on both sides of the equator, the rigidity on both the outer side and the inner side in the vehicle mounting direction of the tire can be improved, and thus the steering stability can be improved. In the example illustrated in FIG. 3, the tread surface 1 has outlines LX and LY including six arcs AR1, AR2, AR3, BR1, BR2 and BR3. At this time, it is essential that the maximum width land portions 3a and 3c have an outline shape respectively including an arc having the minimum radius of curvature ARc2 and BRc2.

In the present disclosure, it is preferable that the respective tire width direction lengths ARw2 and BRw2 of the arcs AR2 and BR2 having the minimum radius of curvature are respectively 15% to 30% of the land portion widths 3aw and 3cw of the maximum land portions 3a and 3c. This is because, when less than 15%, the grounding property cannot be sufficiently improved; and when exceeding 30%, the grounding property at both ends of the maximum land portions is impaired.

It is more preferably 22% to 28%. Thereby, the grounding property at the central portion and the end portions can be optimized.

Except for the above, it is preferable that the tire according to the present embodiment has the same configuration as that of the embodiment illustrated in FIG. 1.

EXAMPLES

Example 1

The following describes Example 1 of the disclosure; however, the disclosure is in no way limited thereto. In order to further clarify the effect of the present disclosure, the following Example Tires and Comparative Example Tires were trial-manufactured according to the tread surface structures illustrated in FIGS. 1 and 3 and the specifications listed in Table 1, and the movement performance and the uneven wear resistance performance thereof were evaluated.

Each Sample Tire of size 205/55R16 was trial-manufactured under the specifications listed in Table 1. Further, each Sample Tire has a depth of 5 mm for a circumferential groove and a width direction groove, and a depth of 4 mm for a sipe.

After mounting each obtained Sample Tire on a rim (having a size of 7.0 J), an internal pressure of 240 kPa was applied, and the movement performance and uneven wear resistance performance were evaluated by the following test method.

(Test Items)

[Movement Performance]

For each of the above tires, the turning performance and braking performance when running on a dry road surface were comprehensively evaluated by sensory evaluation by the driver. A relative value is indicated as the evaluation taking the evaluation result of the tire according to Sample Tire 1 as 100. Note that the larger the value, the better the movement performance.

[Uneven Wear Resistance Performance]

For each of the above tires, the difference in wear amount between the portion with the maximum wear amount and the portion with the minimum wear amount after running on a dry road surface was measured, and the uneven wear performance was evaluated. The result is indicated as an index value taking the result of Sample Tire 1 as 100. Note that the larger the index number, the better the uneven wear resistance performance.

Example 2

The following describes Example 2 of the present disclosure; however, the disclosure is in no way limited thereto. In order to further clarify the effect of the present disclosure, the following Example Tires and Comparative Example Tires were trial-manufactured according to the tread surface structure illustrated in FIG. 2 and the specifications listed in Table 2, and the movement performance and uneven wear resistance performance were evaluated.

Each Sample Tire of size 205/55R16 was trial-manufactured under the specifications listed in Table 2. Further, each Sample Tire has a depth of 5 mm for a circumferential groove and a width direction groove, and a depth of 4 mm for a sipe.

After mounting each obtained Sample Tire on a rim (having a size of 7.0 J), an internal pressure of 240 kPa was applied, and the movement performance and uneven wear resistance performance were evaluated by the same test method as in Example 1. The evaluation results are presented for each specification in the tables [Example 1] and [Example 2].

TABLE 1

[Example 1] (FIGS. 1 and 3)

| | Sample Tire 1 | Sample Tire 2 | Sample Tire 3 | Sample Tire 4 | Sample Tire 5 |
|---|---|---|---|---|---|
| Radius of curvature ARc1 (mm) | 1000 | 1000 | 900 | 1000 | 1000 |
| Radius of curvature ARc2 (mm) | 500 | 500 | 300 | 400 | 400 |
| Radius of curvature ARc3 (mm) | 200 | 200 | 500 | 600 | 600 |
| Radius of curvature BRc1 (mm) | 1000 | 1000 | 900 | 800 | 800 |
| Radius of curvature BRc2 (mm) | 500 | 500 | 300 | 250 | 250 |
| Radius of curvature BRc3 (mm) | 200 | 200 | 500 | 400 | 400 |
| Land portion where arc having minimum radius of curvature is located (3a, 3b, 3c) | 3a | 3a | 3a | 3a | 3a |
| Land portion width of 3a (mm) | 60 | 74 | 74 | 74 | 74 |
| Land portion width of 3b (mm) | 60 | 71 | 71 | 71 | 71 |
| Land portion width of 3c (mm) | 60 | 35 | 35 | 35 | 35 |
| Position of tire width direction center of arc having minimum radius of curvature in land portion width of maximum width land portion | 80% | 80% | 50% | 50% | 50% |
| Length of arc having minimum radius of curvature/land portion width of maximum width land portion | 30% | 30% | 25% | 25% | 25% |
| Land portion width of central land portion 3b/land portion width of maximum width land portion | 100% | 95.9% | 95.9% | 95.9% | 95.9% |
| Distance from tire maximum outer diameter position to center of central land portion/land portion width of central land portion | 0% | 27.5% | 10% | 10% | 6.3% |
| Distance from equator CL to maximum outer diameter position OD/TW | 0% | 0% | 0% | 0% | 7.5% |
| Remarks | Comparative Example | Comparative Example | Example | Example | Example |
| Movement performance | 100 | 110 | 120 | 130 | 135 |
| Uneven wear resistance performance | 100 | 80 | 100 | 100 | 105 |

TABLE 2

[Example 2] (FIG. 2)

| | Sample Tire 6 | Sample Tire 7 | Sample Tire 8 | Sample Tire 9 | Sample Tire 10 |
|---|---|---|---|---|---|
| Radius of curvature ARc4 (mm) | 1200 | 1200 | 1800 | 2200 | 2200 |
| Radius of curvature ARc5 (mm) | 600 | 600 | 600 | 700 | 700 |
| Radius of curvature ARc6 (mm) | 400 | 400 | 120 | 120 | 120 |
| Radius of curvature ARc7 (mm) | 200 | 200 | 400 | 400 | 400 |
| Radius of curvature BRc4 (mm) | None | None | None | None | ∞ |

TABLE 2-continued

[Example 2] (FIG. 2)

|  | Sample Tire 6 | Sample Tire 7 | Sample Tire 8 | Sample Tire 9 | Sample Tire 10 |
|---|---|---|---|---|---|
| Radius of curvature BRc5 (mm) | 1200 | 1200 | 1800 | 1500 | 1500 |
| Radius of curvature BRc6 (mm) | 600 | 600 | 600 | 500 | 500 |
| Radius of curvature BRc7 (mm) | 400 | 400 | 120 | 110 | 110 |
| Radius of curvature BRc8 (mm) | 200 | 200 | 400 | 350 | 350 |
| Land portion where arc having minimum radius of curvature is located (3a, 3b, 3c) | 3a | 3a | 3a | 3a | 3a |
| Land portion width of 3a (mm) | 60 | 74 | 74 | 74 | 74 |
| Land portion width of 3b (mm) | 60 | 71 | 71 | 71 | 71 |
| Land portion width of 3c (mm) | 60 | 35 | 35 | 35 | 35 |
| Position of tire width direction center of arc having minimum radius of curvature in land portion width of maximum width land portion | 85% | 85% | 50% | 50% | 50% |
| Length of arc having minimum radius of curvature/land portion width of maximum width land portion | 30% | 30% | 25% | 25% | 25% |
| Land portion width of central land portion 3b/land portion width of maximum width land portion | 100% | 95.9% | 95.9% | 95.9% | 95.9% |
| Distance from tire maximum outer diameter position to center of central land portion/land portion width of central land portion | 0% | 27.5% | 10% | 10% | 6.3% |
| Distance from equator CL to maximum outer diameter position OD/TW | 0% | 0% | 0% | 0% | 7.5% |
| Remarks | Comparative Example | Comparative Example | Example | Example | Example |
| Movement performance | 105 | 115 | 125 | 135 | 140 |
| Uneven wear resistance performance | 105 | 85 | 105 | 105 | 110 |

The test method was the same as that in Example 1.

REFERENCE SIGNS LIST

1 Tread surface
2a, 2b Circumferential groove
3a, 3b, 3c Land portion
3aw, 3bw, 3cw Land portion width
AR1, AR2, AR3, AR4, AR5, AR6, AR7, BR1, BR2, BR3, BR4, BR5, BR6, BR7, BR8 Arc
ARc1, ARc2, ARc3, ARc4, ARc5, ARc6, ARc7, BRc1, BRc2, BRc3, BRc4, BRc5, BRc6, BRc7, BRc8 Radius of curvature
LX, LY Outline
CL Tire equator
TE Tread edge
OD Maximum diameter position

The invention claimed is:

1. A tire, comprising
a tread surface divided into a plurality of land portions by at least one circumferential groove extending along a tire equator and tread edges, wherein
at least an outline from the tire equator of the tread surface to a tread edge of the tread edges comprises a plurality of arcs each having a different radius of curvature in a width direction cross-sectional view of the tire;
an arc having a minimum radius of curvature among the plurality of arcs lies in a land portion having a maximum tread width direction length among the plurality of land portions;
an arc having a larger radius of curvature is disposed on a tread edge side of the arc having the minimum radius of curvature and disposed at the tread edge; and
the arc having the minimum radius of curvature has a tire width direction length that is 15% to 30% of a tire width direction length of the land portion having the maximum tread width direction length.

2. The tire according to claim 1, wherein
the tread surface is divided into three land portions by two of the circumferential grooves and the tread edges;
a central land portion located at the tread width direction center among the three land portions has a tread width direction length that is 95% to 105% of the tire width direction length of the land portion having the maximum tread width direction length; and
the tire width direction center of the central land portion is located within a range of 10% or less of a tire width direction length of the central land portion from a tire maximum outer diameter position of the tread surface.

3. The tire according to claim 2, wherein
the tire maximum outer diameter position is closer to a tread edge side than the tire equator.

4. The tire according to claim 1, wherein
the tire width direction center of the arc having the minimum radius of curvature is located at 35% to 70% of the tread width direction length of the land portion having the maximum tread width direction length from a tire equator side end of the land portion having the maximum tread width direction length toward the tread edge side.

5. The tire according to claim 4, wherein
the tread surface is divided into three land portions by two of the circumferential grooves and the tread edges;
a central land portion located at the tread width direction center among the three land portions has a tread width direction length that is 95% to 105% of the tire width direction length of the land portion having the maximum tread width direction length; and
the tire width direction center of the central land portion is located within a range of 10% or less of a tire width direction length of the central land portion from a tire maximum outer diameter position of the tread surface.

6. The tire according to claim 5, wherein
the tire maximum outer diameter position is closer to a tread edge side than the tire equator.

7. The tire according to claim 1, wherein
the outline comprises at least three arcs having different radii of curvature.

8. The tire according to claim 7, wherein
the radii of curvature of the at least three arcs satisfies a relationship of 1AR>3AR>2AR, when the at least three arcs are disposed in an order of 1AR, 2AR and 3AR from the tire equator toward the tread edge.

9. The tire according to claim 8, wherein
the tire width direction center of the arc having the minimum radius of curvature is located at 35% to 70% of the tread width direction length of the land portion having the maximum tread width direction length from a tire equator side end of the land portion having the maximum tread width direction length toward the tread edge side.

10. The tire according to claim 8, wherein
the tread surface is divided into three land portions by two of the circumferential grooves and the tread edges;
a central land portion located at the tread width direction center among the three land portions has a tread width direction length that is 95% to 105% of the tire width direction length of the land portion having the maximum tread width direction length; and
the tire width direction center of the central land portion is located within a range of 10% or less of a tire width direction length of the central land portion from a tire maximum outer diameter position of the tread surface.

11. The tire according to claim 10, wherein
the tire maximum outer diameter position is closer to a tread edge side than the tire equator.

12. The tire according to claim 7, wherein
the tire width direction center of the arc having the minimum radius of curvature is located at 35% to 70% of the tread width direction length of the land portion having the maximum tread width direction length from a tire equator side end of the land portion having the maximum tread width direction length toward the tread edge side.

13. The tire according to claim 7, wherein
the tread surface is divided into three land portions by two of the circumferential grooves and the tread edges;
a central land portion located at the tread width direction center among the three land portions has a tread width direction length that is 95% to 105% of the tire width direction length of the land portion having the maximum tread width direction length; and
the tire width direction center of the central land portion is located within a range of 10% or less of a tire width direction length of the central land portion from a tire maximum outer diameter position of the tread surface.

14. The tire according to claim 13, wherein
the tire maximum outer diameter position is closer to a tread edge side than the tire equator.

* * * * *